Jan. 12, 1932.  H. G. TRAVER  1,840,988
AMUSEMENT RIDE AND VEHICLE THEREFOR
Filed March 20, 1929  3 Sheets-Sheet 3

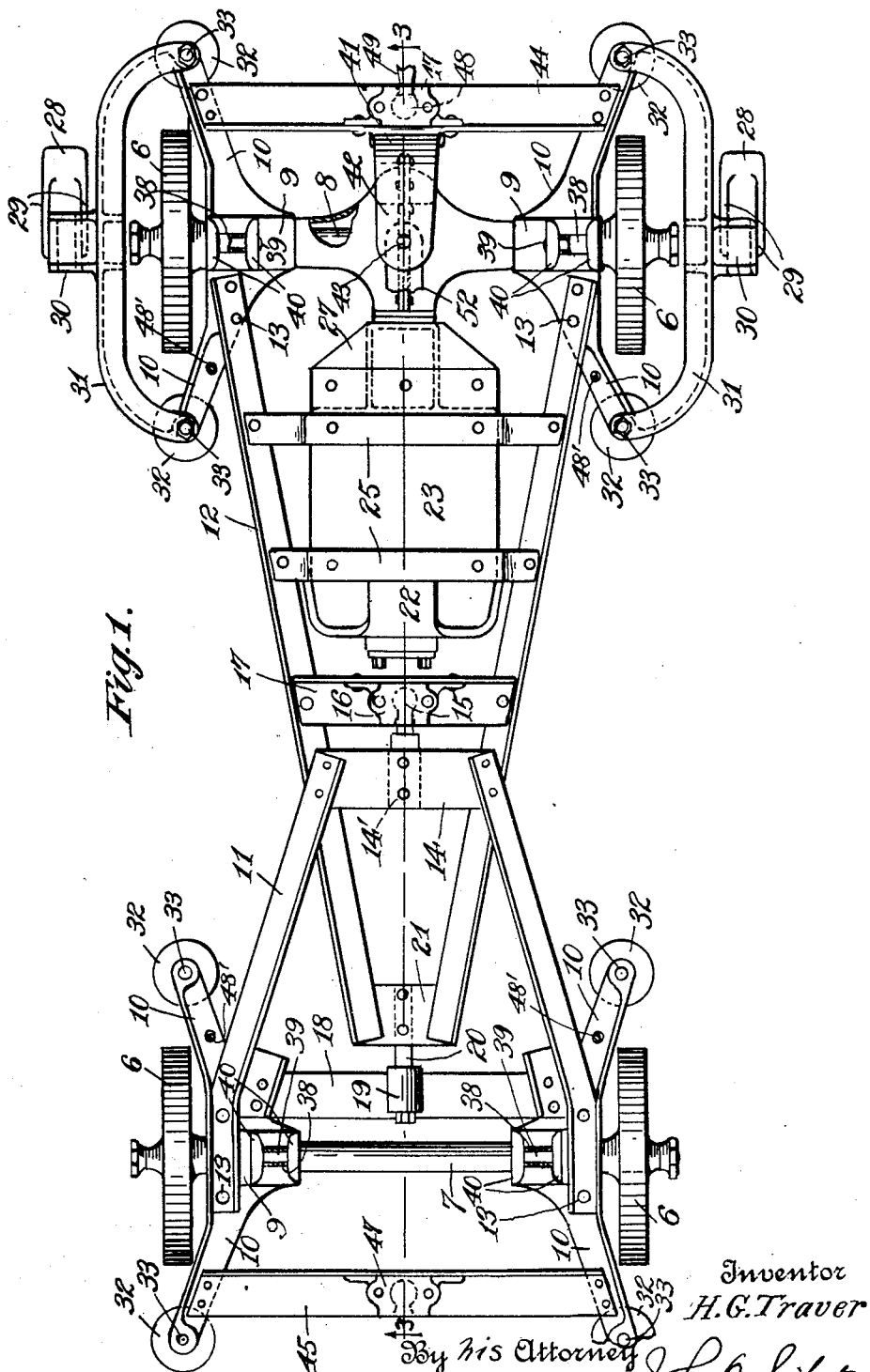

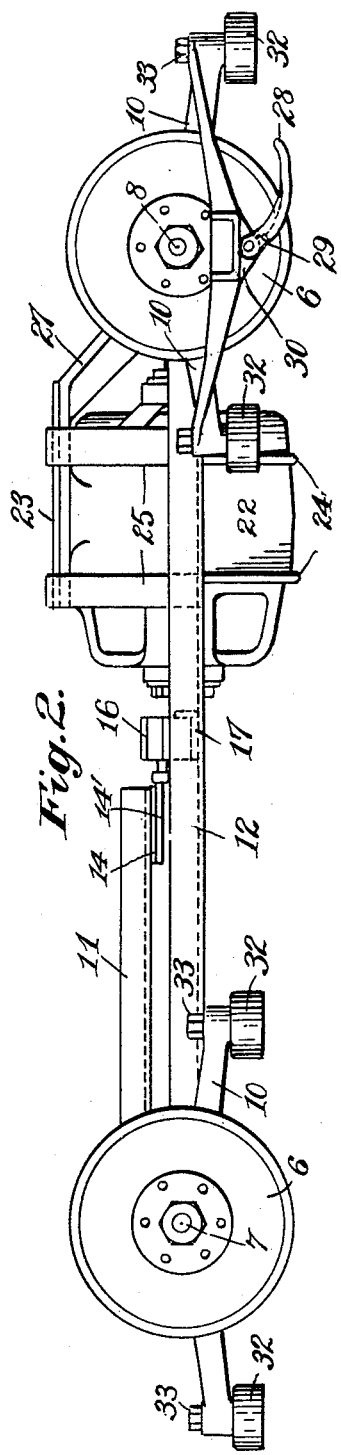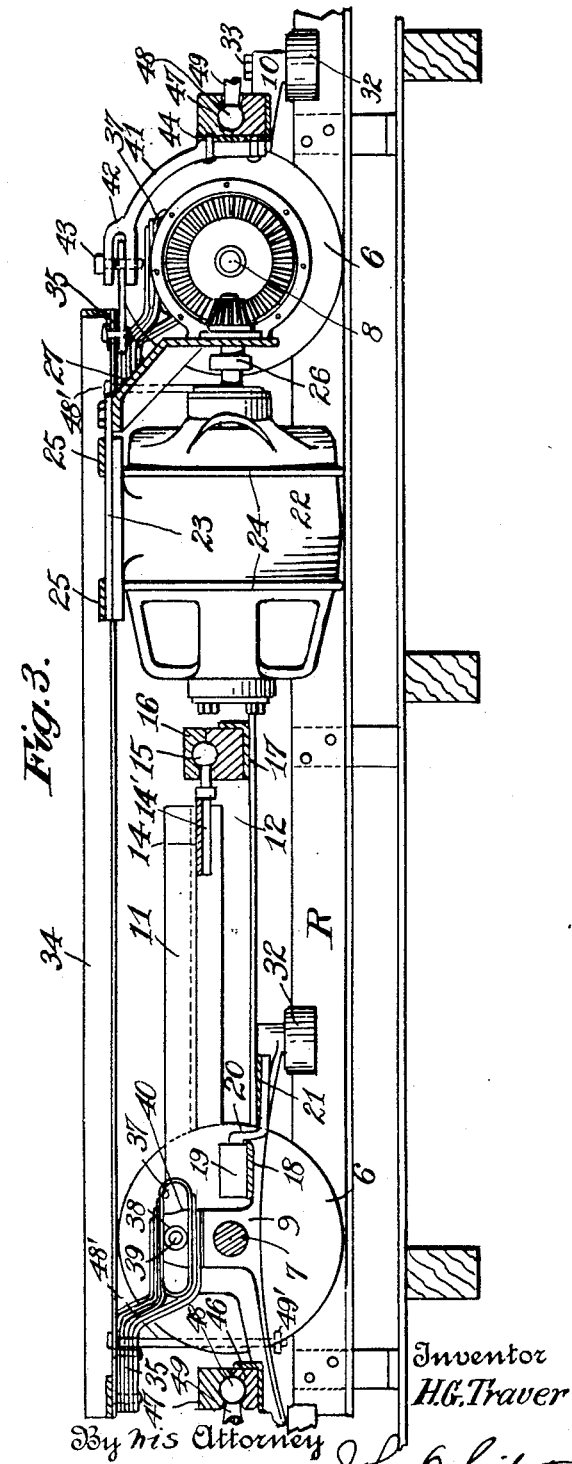

Inventor
H. G. Traver
By his Attorney

Patented Jan. 12, 1932

1,840,988

UNITED STATES PATENT OFFICE

HARRY G. TRAVER, OF BEAVER FALLS, PENNSYLVANIA

AMUSEMENT RIDE AND VEHICLE THEREFOR

Application filed March 20, 1929. Serial No. 348,427.

This invention relates to the structure and suspension of a vehicle particularly adapted for use as passenger carriers in conjunction with amusement rides, although it may be used where the following objects are desirable:

One of the objects of the invention is to provide a flexible traction wheel carrier in a vehicle whereby the traction wheels will adjust themselves to and follow undulations, either laterally or vertically, in the traction surface.

Another object of the invention is to provide in a vehicle an improved traction wheel supported frame embodying a pair of members and each member constituting an independent wheel carrier, and said frame members constructed and arranged whereby they are adapted to have universal adjustment one relative to the other and accommodate themselves to the travel of the traction wheels over undulations in the traction surface, and to also take up the stresses and strains imparted thereto by the travel of the traction wheels over such undulations in the traction surfaces.

Another object of the invention is to provide power means and power transmitting means mounted on a frame member and operatively connected with a traction wheel axle and adapted to participate in the adjustment of the frame members due to the travel of the traction wheels over undulations in the traction surface without affecting the driving connection between the means and the traction wheel axle, and said mounting being arranged to take up the stresses and strains of the driving torque of the means.

A further object of the invention is to provide an improved spring suspension for a body or body frame in a vehicle whereby to permit of movement of the traction wheel carrier frame members relative to each other, due to the travel of the traction wheels over undulations in the traction surface, without affecting participating movement in the vehicle body.

A further object of the invention is to provide novel electric current transmitting means to supply electric current to the motor of the power means when the vehicle is used in conjunction with an amusement ride.

A still further object of the invention is to provide a traction wheel carrier constructed and arranged with means to co-operate with a track structure to steer the vehicle when used in connection with an amusement ride.

Other objects and advantages will hereinafter appear.

The embodiment of the invention as illustrated comprises structural features of a vehicle used in conjunction with an amusement ride having traction wheels to ride upon a declivous and winding track of an amusement ride and rotatably mounted on a pair of axles, said axles having brackets mounted thereon adjacent each wheel carrying rollers in advance and rearwardly of each wheel to engage a portion of a track rail or rails extending vertically of the rail tread to guide the vehicle on said track and downward extending shoes having a horizontal portion below the rail tread to prevent jumping of the vehicle wheels from the tracks. The axles are linked together by a pair of frame members each fixed at one end of each member to the axle brackets on an axle and the free ends superposed one to the other with one of said latter ends connected to an intermediate portion of the other member the latter end of which is slidably and pivotally supported on a brace connecting the brackets and extending parallelly of the axles to permit universal movement of the frame members relative to each other on axes extending longitudinally and vertically of the frame. One of the axles, preferably the rear axle, is arranged as a driving axle embodying the usual differential gearing used in connection with the driving wheel axles of motor vehicles and operatively connected with an electric motor mounted on the frame member supported at one end by the driving axle. The motor is electrically connected to contact shoes for connection with a source of power, said contact shoes being pivotally suspended from members carried by the axle brackets at the outer side of the wheels to engage electric conductor rails arranged in parallel relation to the track rails. The vehicle body is suspended upon the traction wheel supported frame members by a pair of springs mounted on each axle to permit of the wheel supported frame members to have universal movement relative to each other independent of the body and permit of movement of the body on an axis extending transversely of the frame members and hold the body against movement longitudinally of the frame members. In amusement rides it is desirable to couple a number of the vehicles in a train for which purpose a beam is extended transversely between and fixed at the opposite ends to the axle brackets forwardly of the front wheels and rearwardly of the rear wheels, coupling members being fixed on said beams on the longitudinal axis of the vehicle.

In the drawings accompanying and forming a part of this application, Figure 1 is a plan view of a traction wheel supported frame embodying the invention.

Figure 2 is a side elevational view looking at the bottom of Figure 1.

Figure 3 is a longitudinal sectional view taken on the line 3—3 of Figure 1 looking in the direction of the arrows and showing in addition a body frame suspended from the traction wheel supported frame and a portion of the track structure.

Figure 4:
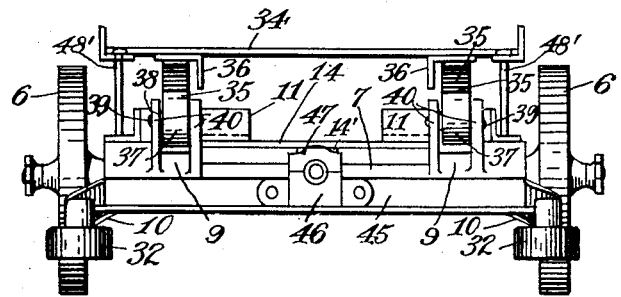
Figure 4 is an end elevational view looking at the left of Figure 3.

In carrying out the embodiment of the invention illustrated there is provided traction wheels 6 rotatably mounted on axles 7, 8 to engage an inwardly extending horizontal portion of angle rails R and constituting the tread portion of the track rails of the structure of an amusement railway ride. The axle 7 is a one piece shaft having reduced portions at the ends for the mounting of the wheels thereon. The axle 8 forming the rear axle comprises a housing rotatably carrying shafts to which the wheels are fixed, said shafts being operatively connected with a drive shaft through differential gearing intermediate the ends of the housing in a usual manner. Means are provided to adapt the vehicle to the positioning of the wheels in varying levels one relative to the other and of the axles in different angular relation to the horizontal and each other. For this purpose both axles are arranged with brackets having a hub or sleeve portion 9 embracing the axles and having integral arms 10 extending from opposite sides of the portion 9 obliquely to the axis of the axle and terminating in the front and rear of each traction wheel.

The axles are connected by a frame and to facilitate the traction of the wheels during the rounding of curves and the banked portion of a track structure in an amusement ride the frame is arranged with a pair of members 11, 12 having converging and diverging sides and fixed at the diverging ends to the brackets at the juncture of the sleeve portion 9 and the arms 10 by bolts, as shown at 13 in Figure 1. The converging ends are arranged in superposed relation to each other, in the present instance with the member 11 uppermost. The sides of frame member 11 at the converging end are connected by a head or cross piece 14 to which is fixed on the longitudinal axis of the vehicle a bracket 14' carrying a pin or projection having a spherical end 15 to engage and have universal movement within a socket portion 16 formed in corresponding spherically recessed blocks bolted together and fixed upon a cross piece 17 fixed to the sides of the frame member 12 intermediate the ends thereof to permit the frame members to move independent of each other about the longitudinal axis of the vehicle and on a vertical axis intersecting the longitudinal axis of the vehicle. Stresses and strains developed by the connection 15, 16 between the frame members are taken up partly by supporting the end of the member 12, extending below the member 11 and to adjacent the axle 7, on a brace 18 having a flat horizontal upper surface suspended between and connected to the opposed bracket arms 10 mounted on said axle, by a roller 19 rotatably mounted on the end of a spindle 20 projecting forward of and in a plane above a cross member 21 joining the converging ends of the sides of frame member 12 and to which cross member the spindle is fixed. By this arrangement the member 12 is not only adapted to have movement in a direction on an axis extending transversely of the frame members but also about an axis extending longitudinally of said members and relative to and independent of the frame member 11.

The wheels carried by the axle 8 are driven by an electric motor 22 suspended from a platform 23 by straps 24 encircling the motor, and the platform is supported between the sides of the frame 12 by U-shaped brackets 25 fixed to the frame sides and the platform. The motor shaft is operatively connected to the differential means of the axle 8 by a universal coupling, shown in a conventional manner at 26, and the frame member 12 is relieved of the torsional strain of the driving torque of the motor by a bracket 27, which is in the nature of a sheathing fixed to an extended end of the motor mounting platform 23 and arranged with a vertical portion having a perforation for the passage of the drive shaft of the differential and fixed to the axle housing, as shown in Figure 3. By this arrangement not only is the driving stress of the motor transmitted through the axle housing to the traction wheels and taken up through the latter in the track structure, but bracket 27 also maintains the motor and axle housing in alinement.

The electric current to operate the motor is transmitted from a source of supply by contact shoes 28 electrically connected with the motor. The shoes are arranged at one end with a pair of perforated ears 29 engaged at the opposite sides of and pivotally connected to hanger portions 30 of U-brackets 31 by pins extended through said ears and hanger portions. The brackets 31 are suspended between the ends of the arms 10 of the frame brackets 9 at the outer side of the traction wheels 6 so that the free ends of the shoes forming the contact portion will engage by gravity electric conductor rails C fixed upon the track structure parallel with the track rails R. The shoes are electrically connected to the motor by a wiring system (not shown) suitable to the type of electric current used.

To steer or direct the vehicle when used in conjunction with an amusement ride through the travel of the vehicle rollers 32 are rotatably mounted on pins or studs 33 fixed in the ends of the arms 10 of the frame brackets on both axles. The ends of the arms are extended relative to the wheels and the rollers are of a diameter so that the periphery of the rollers project beyond the outer side of the wheels to engage the vertical portion of the angle rails R retaining the wheels on the tread or horizontal portion of said rails due to the spacing of the rails a distance slightly greater than the distance between the outer periphery of the opposed rollers, as shown in Figure 5.

Figure 5:
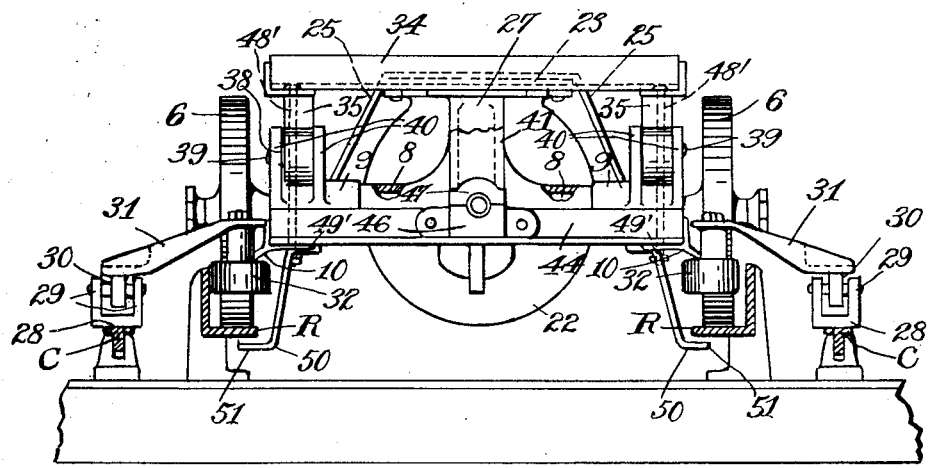
Figure 5 is an end elevational view looking at the right of Figure 3, and showing the vehicle relative to a portion of the track structure.

The vehicle body is suspended from the traction wheel supported frame members through a frame 34, which may be the body frame, formed of parallel side sills and cross pieces, and flexibly supported from the axle brackets by laminated leaf springs 35 fixed at one end to the frame by bolting to the sides thereof relative to the axle 8 and to additional parallel angle pieces 36 relative to the axle 7, as shown in Figures 4 and 5, with the opposite ends of the outer leaves of the springs spread and an intermediate leaf folded upon itself to form an open loop 37 between the spread leaves for the slidable engagement of bushings 38 rotatably carried by pins 39 fixed in and extending between opposed lugs 40 projecting upwardly from and integral with the hubs 9 of the axle brackets in the nature of shackle bolts. To prevent undue movement of the vehicle body in a direction longitudinally of the frame members on the bushing carrying pins 39 an arm 41 of arcuate shape is arranged with a horizontal extending bifurcated end 42 embracing the opposite surfaces of a link 52 pivotally connected to the end cross piece of the body frame, and pivotally connected thereto by a pin 43 passing through perforations in the legs of the bifurcation and the link, and the opposite end of the arm is fixed intermediate the ends of a cross member or strut 44 of angle shape in cross section, fixed to opposed arms 10 of the brackets on axle 8 and in the rear of said axle. Such pivotal mounting of the arm to the chassis permits lateral movement thereof during the riding of the vehicle over lateral and vertical undulations in the track.

Any suitable passenger carrying or other type of vehicle body may be fixedly mounted on the frame 34 and therefore it is not deemed necessary to illustrate or describe such vehicle body.

When the vehicle is used in connection with on amusement railway it is advisable from a monetary viewpoint to couple a number of cars together to form a train. For this purpose each end of the vehicle is provided with a coupling, the one at the rear being fixed to the cross member 44, and the one at the forward end on a similar cross member 45 fixed to the bracket arms 10 forward of the traction wheels. Each coupling member comprises a block 46 fixed to the cross members on the longitudinal axis of the vehicle and having a semi-spherical recess portion and a block 47 having a recess corresponding to recess in block 46 is bolted to the block 46 the recesses forming a spherical chamber for the mounting of a globular shaped head 48 of a coupling pin or link 49.

To prevent the vehicle from leaving the track rails R safety shoes 50 are fixed by an angle portion at one end to the underside of the hubs 9 of the axle brackets with the opposite end bent horizontally outward, as at 51, to extend below a free marginal portion of the horizontal tread portion of the track rails R to engage said portion if the wheels leave the rails.

As a further safety means to prevent the body from separating from the frame members 11, 12 due to the breaking of a body suspending spring or springs 35 while the vehicle is in motion and possible injury to passengers of the vehicle, bolts 48' are fixed in the body frame and extended loosely through openings in the rearwardly extending arms 10 of the brackets on the forward axle and in the forwardly extending arms of the brackets on the rear axle. These bolts have nuts 49' secured on the ends outside of the arms 10 to limit the movement of the body frame in a direction away from the arms, thus not only serving as a means to prevent displacement of the body frame but also limiting the reflex movement of the springs.

While I have illustrated and described one embodiment of my invention it will be obvious that various modifications may be made in construction and arrangement of parts, and that portions of the invention may

Having thus described my invention, I claim:

1. In a vehicle, a traction wheel supported frame comprising a pair of members, one member supported from and connected to the other to have universal movement relative to each other about the longitudinal axis of the frame and on a vertical axis intersecting the longitudinal axis of the frame, and means to suspend a body from said wheel supported frame to permit said body frame and wheel supported frame to have lateral movement relative to each other.

2. In a vehicle, a pair of traction wheel carrying axles, brackets mounted on the axles and arranged with an arm projecting in advance and rearwardly of the traction wheels, rollers carried by the arms to extend beyond the outer side of the wheels for engagement of portions of track rails extending vertically of the tread, and a pair of frame members, each member fixed to the brackets on an axle and connected to have movement relative to each other on axes extending longitudinally and vertically of the frame.

3. In a vehicle, a pair of traction wheel carrying axles, a pair of brackets mounted on each axle relative to each traction wheel, a brace connecting one pair of brackets, a pair of frame members, one frame member fixed at one end on a pair of brackets on one axle and one end of the other frame member fixed on the pair of brackets on the other axle, and the opposite ends of the frame members superposed one to the other with said end of one frame member supported on the bracket connecting brace to have pivotal movement about the longitudinal axis of said frame member and longitudinally of the brace, and said end of the other frame member connected to the brace supported frame member whereby said members are adapted to have universal movement relative to each other on axes extending longitudinally and vertically of the frame.

4. A vehicle as claimed in claim 3, wherein the universal connection of the frame members comprises a socket portion carried by the brace supported member, and a bracket fixed to the superposed end of the other member and having a ball portion for engagement in the socket portion.

5. A vehicle as claimed in claim 3, wherein one of the axles is arranged with power transmitting means, and the brace supported frame is supported from said axle and carries a motor connected to said power transmitting means to propel the vehicle.

6. A vehicle as claimed in claim 3, wherein a pair of the brackets are arranged with arms projecting laterally one in advance and the other rearwardly of the adjacent traction wheel, and U-members carried by the arms at the outer side of the traction wheels and carrying electric contact shoes to engage electric conductors for the transmission of power to a motor carried by the brace supported member.

7. In a vehicle, a pair of traction wheel carrying axles, brackets mounted on the axles relative to each traction wheel, a pair of frame members fixed on the brackets and connected to each other to have movement relative to each other on axes extending longitudinally and vertically of the members, a body frame, springs fixed to said frame and loosely connected to the brackets to permit of limited movement of the body frame and the wheel supported frame members, and means to hold the body frame against movement longitudinally of the wheel supporting frame members and permit of movement of the frame member laterally of said body frame.

8. A vehicle as claimed in claim 7, wherein the springs are connected to the brackets by pins fixed to the brackets and extending parallelly of the axles engaged in elongated loops of the springs, and a brace fixed to opposed brackets and pivotally connected to the body frame to prevent longitudinal movement and allow lateral movement of said body frame.

9. In a vehicle, a pair of traction wheel carrying axles, brackets mounted on the axles relative to each traction wheel and arranged with arms projecting laterally one in advance and the other rearwardly of the wheels, rollers carried by the arms with the peripheries extending beyond the wheels, a pair of frame members fixed to the brackets and connected to have movement relative to each other on axes extending longitudinally and vertically of the members, struts connected to the opposed arms remote from the frame members, and a coupling member fixed to said struts adapted for connecting the vehicle in a train.

10. A vehicle as claimed in claim 3, wherein the one frame member is supported on the bracket connecting brace by a roller carried by the frame member.

11. In a vehicle, a pair of traction wheel carrying axles, one of said axles arranged with power transmitting means, brackets mounted on the axles relative to each wheel, a pair of frame members fixed to the brackets and connected to have movement relative to each other on axes extending longitudinally and vertically of the members, a motor carried by one of the frame members and connected to the power transmitting means to propel the vehicle, and a brace fixed to the motor support and the axle arranged with the power transmitting means to relieve the frame member carrying the motor of the stress of the driving torque of the motor.

12. In a vehicle, a pair of traction wheel carrying axles, frame supporting brackets mounted on said axles within the wheels, each bracket having a pair of arms, one arm extending forwardly and the other arm rearwardly of each traction wheel and the ends diverging in a direction toward the wheels, and a roller carried by each arm to rotate in a plane transverse to the plane of rotation of the traction wheels and said rollers extending beyond the outer side of the traction wheels for engagement of opposite rails of a track to guide the vehicle.

Signed at the city of New York, in the county of New York and State of New York, this 27th day of February, 1929.

HARRY G. TRAVER.